United States Patent
Burns et al.

(10) Patent No.: US 8,411,847 B2
(45) Date of Patent: Apr. 2, 2013

(54) ACOUSTIC ECHO CANCELLER

(75) Inventors: Bryan J. Burns, San Jose, CA (US); Yair Kerner, Irvine, CA (US); Eitan David, Irvine, CA (US)

(73) Assignee: Conexant Systems, Inc., Newport Beach, CA (US)

( * ) Notice: Subject to any disclaimer, the term of this patent is extended or adjusted under 35 U.S.C. 154(b) by 1248 days.

(21) Appl. No.: 12/136,436

(22) Filed: Jun. 10, 2008

(65) Prior Publication Data

US 2009/0304177 A1    Dec. 10, 2009

(51) Int. Cl.
*H04M 9/08*     (2006.01)
*A61F 11/06*     (2006.01)
*H04B 3/20*     (2006.01)
*H04B 1/38*     (2006.01)

(52) U.S. Cl. .................... 379/406.1; 381/71.11; 370/292

(58) Field of Classification Search .................... 381/66; 370/278, 282–292; 455/570
See application file for complete search history.

(56) References Cited

U.S. PATENT DOCUMENTS

| | | | |
|---|---|---|---|
| 5,740,242 A * | 4/1998 | Hayashi | 379/406.1 |
| 5,978,763 A * | 11/1999 | Bridges | 704/233 |
| 6,442,273 B1 * | 8/2002 | Okuda | 379/406.03 |
| 2003/0223382 A1 * | 12/2003 | Popovic et al. | 370/286 |
| 2004/0125942 A1 * | 7/2004 | Beaucoup et al. | 379/406.01 |
| 2004/0125944 A1 * | 7/2004 | Popovic et al. | 379/406.01 |
| 2006/0241942 A1 * | 10/2006 | Chen et al. | 704/230 |

* cited by examiner

*Primary Examiner* — Fan Tsang
*Assistant Examiner* — Jeffrey Lytle
(74) *Attorney, Agent, or Firm* — Jackson Walker L.L.P.; Christopher J. Rourk

(57) ABSTRACT

Disclosed methods and systems measure acoustic responses to training signals activated prior to communication sessions. Profiles related to the acoustic responses are saved and adapted during communication sessions. Training signals may have uniform frequency distributions over a frequency range and may be in response to user inputs, timeouts, or predetermined events. In the next excessive divergence is detected, an adapted profile may be substituted by an original, trained profile.

19 Claims, 3 Drawing Sheets

ACOUSTIC ECHO CANCELLER

FIELD OF THE DISCLOSURE

This disclosure relates to acoustic echo cancellers, and more specifically to a method and apparatus for acoustic echo cancellation in which pre-call training signals are used to establish a trained profile used during communication sessions to reduce acoustic echo.

BACKGROUND OF THE INVENTION

Acoustic echoes may arise when sounds from speakers are sensed by microphones in full duplex communication systems. Acoustic echo cancellers may use live speech signals during conversations to estimate and remove acoustic echoes.

SUMMARY OF THE INVENTION

Disclosed exemplary embodiments of the present invention initiate pre-call training sessions to estimate environment responses, such as impulse responses or frequency responses, for estimation and reduction of acoustic echoes and to provide other useful functions.

In one exemplary embodiment of the present invention, a method for acoustic echo cancellation includes measuring a first acoustic response from a training signal introduced within an environment. A trained profile based on the measured first acoustic response is saved and accessed prior to establishing a session. An acoustic echo cancellation profile is generated using the trained profile and adapted during a communication session.

In another exemplary embodiment of the present invention, an acoustic echo canceller includes a training system for activating a training signal and for storing a trained profile based on a first response from an environment to the training signal. The acoustic echo canceller includes an adaptive filter for using the trained profile to subtract an estimated echo from a speech signal to result in a filtered speech signal. The adaptive filter is further used for developing a refined profile based on further responses from the full duplex communication circuit to the filtered speech signal.

In still another aspect, an acoustic echo cancellation system includes a means for activating a training sequence prior to a user requesting a communication session from a full duplex communication system. The training sequence includes machine-generated audio signals. The acoustic echo cancellation system further includes a detector for measuring an impulse response to the training sequence from a portion of the full duplex communication system. The first acoustic response is used in creating a trained profile. The detector measures acoustic responses from the full duplex communication system to the trained profile. An adapted profile is created based on the trained profile. The adapted profile is reiteratively modified based at least in part on the further acoustic response estimations. The acoustic echo cancellation system further includes a divergence detector for determining whether a threshold level of divergence has occurred between the adapted profile and the trained profile during the communication session. The adapted profile is reset to the trained profile in response to detecting a threshold level of divergence.

Those skilled in the art will further appreciate the advantages and superior features of the invention together with other important aspects thereof on reading the detailed description that follows in conjunction with the drawings

DETAILED DESCRIPTION OF PREFERRED EMBODIMENTS

Figure 1:
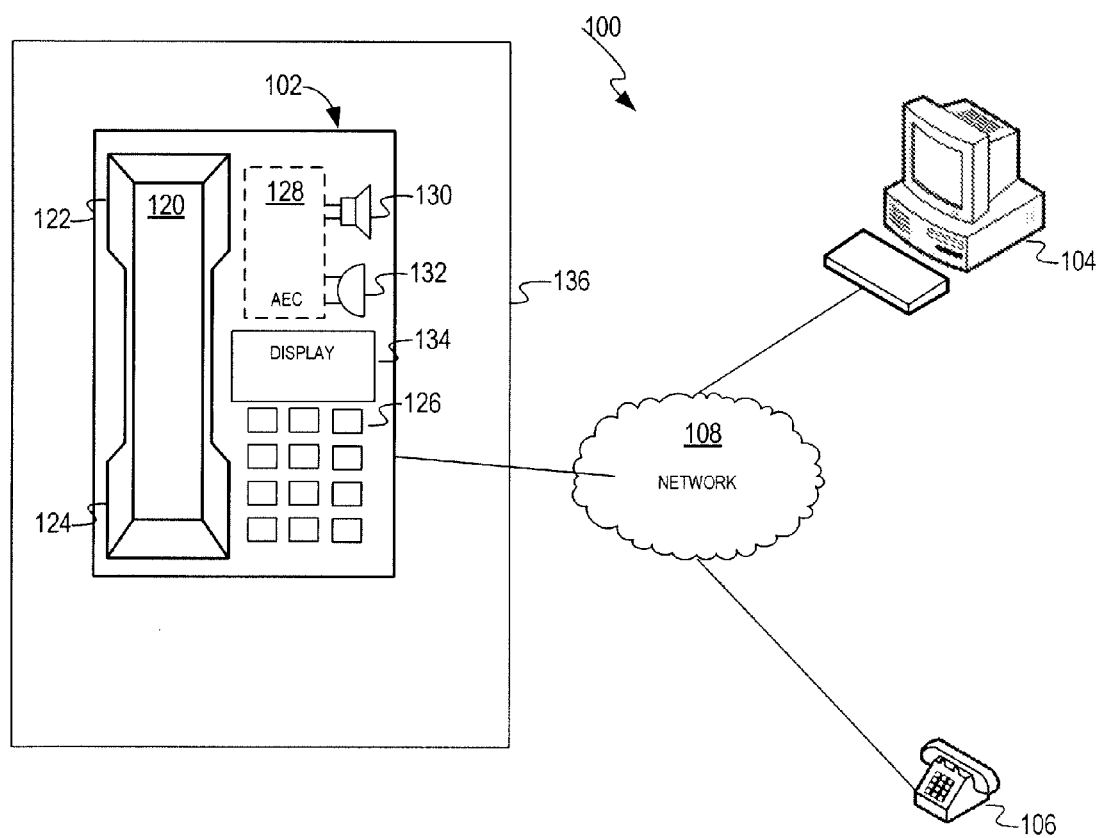
FIG. 1 illustrates a full duplex communication system in which an acoustic echo cancellation system is configured and operated prior to and during communication sessions in accordance with an exemplary embodiment of the present invention.

In the description that follows, like parts are marked throughout the specification and drawings with the same reference numerals, respectively. The drawing figures might not be to scale, and certain components can be shown in generalized or schematic form and identified by commercial designations in the interest of clarity and conciseness.

Acoustic echo cancellers AECs are regularly used to improve the sound quality of conversations conducted over full duplex communication systems, for example. In a full duplex communication system, two or more users communicate simultaneously with each other in both directions. Such full duplex conversations may be conducted using communications systems (i.e., devices) that use microphones and speakers, such as speakerphones, mobile telephones, modems, fax machines, personal computers, videophones. Acoustic echo may occur when sounds from a speaker (e.g., a telephone handset earpiece) are picked up by a microphone in the same room (e.g., the same handset's microphone). AEC's often use speech signals during communications sessions (i.e., conversations) to estimate the echo response of the acoustic environment. In this way, an AEC may be trained to account for and reduce the acoustic echo. There are challenges to solely using speech input during conversations to train an AEC. For example, speech signals may not be ideal for echo estimations because speech signals often have non-uniform frequency distributions. In addition, speech signals are non-stationary and it may be unexpected when each participant in a conversation starts and stops talking. Further, when AEC divergence occurs, the AEC needs to be reset. In such cases, until the AEC is re-trained the ability to have full duplex conversations may be suspended.

These challenges may be addressed by including speech detectors that tell an AEC when speech activity is detected from either side of the conversation. However, this may present further challenges if it is difficult to distinguish between local speech and the echo of incoming speech. Double filtering may be used to address divergence. Double filtering often requires keeping a backup of the latest trusted estimation of echo. Two echo cancellations are performed: one echo cancellation is performed with the backup estimation and one echo cancellation is performed with latest estimation. The output from the backup estimation is sent to the remote device participating in the conversation. The outputs of both estimations AEC's are used in deciding which is better. Ultimately, the better estimation is copied over the worse estimation. Double filtering, when performing the above steps, requires relatively high computational complexity. Further, many double filtering AEC systems do not reliably select the best estimation of acoustic echo.

In the disclosed exemplary embodiments, short training sequences that may include machine generated audio signals are activated prior to a communication session. Upon training completion, the AEC has a reliable estimation of the echo response of the acoustic environment (i.e., a profile). The AEC stores the profile in a memory. When a subsequent conversation starts, the AEC loads the profile from the memory and then continues with slow learning of the echo response in order to adapt to small changes in the environment, for example. Accordingly, the disclosed exemplary embodiments address challenges of using speech signals exclusively for estimation because the pre-call training sequences may be constructed to better estimate an acoustic echo expected during subsequent communication sessions. For example, the training sequence can include frequency components that have similar levels at frequencies that are spread over a desired frequency band (e.g., a voice band of about 190 Hz to 5 kHz or other suitable frequency bands). In addition, divergence issues can be addressed by resetting the AEC to the initial, trained profile if AEC divergence is detected. Alternatively, some distance measure between the latest estimation (i.e., the adapted profile) and the trained profile (i.e., the initial profile) can be tracked such that the adapted profile (i.e., the current estimation) is limited from drifting away from the trained profile. Such systems can be especially useful in communications systems that are not predisposed to have significant changes in the echo, such as a speakerphone or a laptop PC with internal microphone and speakers fixed to the PC chassis. In addition, such systems can be particularly useful if, after initial set up and training of the AEC, a user does not cause significant changes to an environment in which communication sessions are conducted.

In the disclosed exemplary embodiments, training sessions can occur frequently or infrequently. For example, short training sessions can be initiated as often as required using external controls (e.g., timeouts, user inputs, event responses). Training can be activated before every conversation begins or upon a user requesting speaker phone functionality from a communication device (e.g., pressing a "speakerphone" button on a telephone). Training can take place automatically before each communication session using a customized ringer sound that signals incoming calls and is otherwise optimized to include frequency components that provide a spectrum similar to that expected during a conversation. On the other hand, short training sessions can be activated just once by a system builder if the most significant echo characteristics are expected to remain unchanged throughout the use of the system. Other suitable training processes can also or alternatively be used.

FIG. 1 illustrates a communication system 100 for performing acoustic echo cancellation during full duplex communication sessions in accordance with an exemplary embodiment of the present invention. Telephone 102 can establish a connection with telephone 106 or data processing system 104 (e.g., PC) over network 108. Telephone 106 and telephone 102 can be a mobile device, smart phone, facsimile, modem, land-line based telephone, speakerphone, laptop PC, voice over Internet protocol (VoIP) device, other suitable communication devices, or a suitable combination of devices. Telephone 102 is shown within environment 136, which can be a car, an office, outdoors, or other suitable environments. During a communication session, environment 136 can be subject to change, for example as background noise increases, as a user exits a vehicle, as a user walks outside, and the like. Therefore, the disclosed exemplary embodiments can continually adapt or possibly reset based on detected responses to environment 136.

To establish a communication session, a user of telephone 102 can use input keys 126 to dial a network-identifier associated with telephone 106, such as a telephone number or an Internet address. As the user dials the number for telephone 106, display 134 can show the number dialed. Display 134 can be a liquid crystal diode (LCD) screen or other suitable known or future technology for presenting a user with confirmation of the dialed number. In some embodiments, input keys 126 employ dual-tone multi-frequency (DTMF) signaling to allow telephone 102 to call a switching center within network 108 for establishing a communication session with telephone 106 or data processing system 104, for example. In one exemplary embodiment, the tones used for dialing can be played through a speaker 130 and sensed by microphone 132 to allow AEC 128 to establish a trained profile for echo cancellation prior to or during the set up of a communication session or in other suitable manners.

As shown, telephone 102 includes handset 120 with a handset speaker 122 and a handset microphone 124. During a full duplex conversation using microphone 124, a user can speak into microphone 124. The sound that is picked up by microphone 124 is transmitted, for example, to telephone 106 or other suitable devices that are engaged in a communication session with telephone 102.

Telephone 102 includes a microphone 132 for converting audible sounds from a user into electric signals during a full duplex communication sessions (e.g., a conversation). Speaker 130 can be an electro-acoustic transducer that converts electrical signals, for example from telephone 106, into sounds loud enough to be heard by a user of telephone 102, or other suitable devices. In some cases, sounds from speaker 130 are reflected off of objects within environment 136 and can result in acoustic echo. In addition, sounds from speaker 130 can be picked up by microphone 132, so that when a user of telephone 106 speaks, the sounds of the user are converted to electrical signals, sent over network 108, and converted to acoustic signals played by speaker 130 loud enough for microphone 132 to pick up the audio signals directly and after they reflect within the environment 136. These signals, which are transmitted back to telephone 106, are called acoustic echo. In one exemplary embodiment, acoustic echo canceller 128 is communicatively coupled to microphone 132 and reduces or eliminates acoustic echo that is otherwise picked up by microphone 132. As used herein, the term "coupled" and its cognate terms such as "couples" or "couple," can include a physical connection (such as a wire, optical fiber, or a telecommunications medium), a virtual connection (such as through randomly assigned memory locations of a data memory device or a hypertext transfer protocol (HTTP) link), a logical connection (such as through one or more semiconductor devices in an integrated circuit), other suitable connections, or a suitable combination of connections.

In one exemplary embodiment, AEC 128 is a training system for activating a training signal and for storing a trained profile based on a first response to the training signal. In this exemplary embodiment, the training signal results in an audible sound coming from speaker 130 and being picked up by microphone 132. The training signal can have a frequency distribution that is substantially uniform across a predetermined frequency range, for example between 200 Hz and 5000 Hz, or other suitable frequency ranges.

Training sessions can be initiated, from the perspective of telephone 102, when calls are either received or made. When calls are made, a user can dial a telephone number for a remote telephone device (e.g., telephone 106) on keypad 126 or in other suitable manners. Training of AEC 128 can occur through adapting an echo cancellation profile based on the response of environment 136 to a training signal played through speaker 130 and detected by microphone 132. Alternatively, an echo cancellation profile can be adapted or created based on the response of environment 136 to a training signal played through speaker 122 and received by microphone 124 or in other suitable manners. The tones can be DTMF tones that correspond to a telephone number of a remote device (e.g., telephone 106). When telephone 102 receives a telephone call, AEC 128 can be trained using a ringer signal made up of multifrequency tones designed to allow optimum training of AEC 128. In this way, AEC 128 can be trained automatically at the initiation of a communication session, whether a call is being placed or received.

In another exemplary embodiment, AEC 128 is an adaptive filter for using a trained profile to subtract an estimated echo from a speech signal received by microphone 132 to result in a filtered speech signal. After echo cancellation, the filtered speech signal is forwarded to telephone 106 or data processing system 104, as examples. During a communication session, AEC 128 refines the stored profile based on further environment responses to audible sounds, for example, from voice input provided by a user. Using a stored profile, AEC 128 subtracts echo portions from received speech signals. As a communication session takes place the stored profile can be adapted into a refined profile based on further environment responses.

AEC 128 can further include systems for detecting divergence between a refined profile and the original stored profile and replacing the refined profile with the stored profile if the amount of divergence reaches a threshold value. Additionally, if too much of a speech signal is subtracted and there is a divergence between a received speech signal and a filtered speech signal during a communications session, the refined profile can be substituted with the originally stored profile.

In another exemplary embodiment, a user can be prompted to provide voice input that is used in deriving a training signal. For example, a user can be audibly or visually prompted (e.g., with speaker 130 or display 134) to provide a voice sample. The voice sample can be analyzed to determine a frequency range for the user. The system can then generate audible tests signals (e.g., test tones) that substantially evenly cover the frequency range provided by the user. The audible test signals can also cover a frequency distribution that is a predetermined amount higher and lower than the frequency range of the sampled voice signal. Accordingly, AEC 128 is configured prior to calls to provide acoustic echo cancellation refined during calls to improve, and monitored to prevent excessive divergence.

Figure 2:
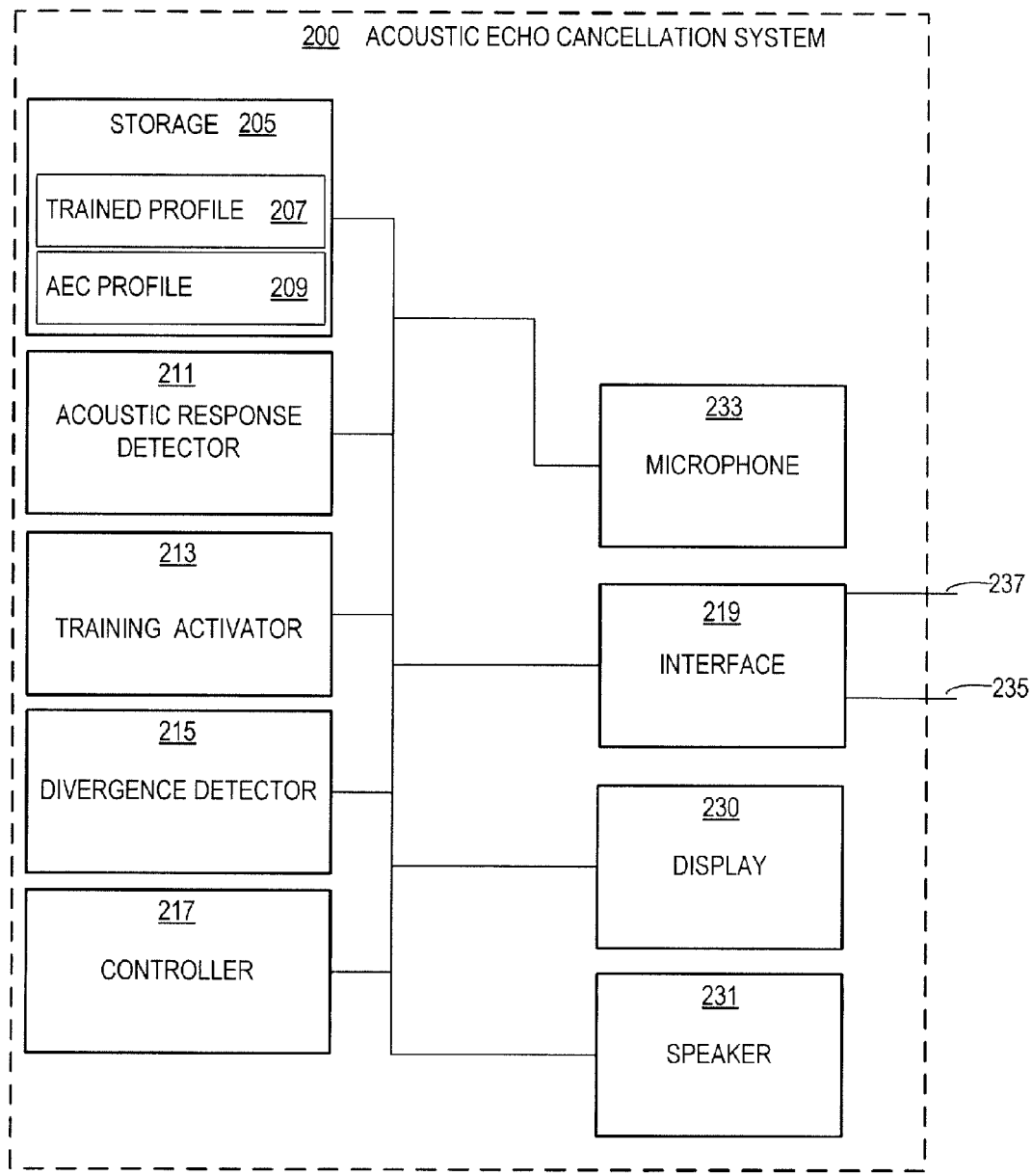
FIG. 2 illustrates in block diagram form a system for performing acoustic echo cancellation in accordance with an exemplary embodiment of the present invention.

FIG. 2 illustrates in block diagram form an acoustic echo cancellation system 200 operational to reduce acoustic echo in accordance with an exemplary embodiment of the present invention. Controller 217 can be implemented in hardware, software, or a suitable combination of hardware and software, and can be one or more software applications operating on a digital signal processor. As used herein, "hardware" can include a combination of discrete components, an integrated circuit, an application-specific integrated circuit, a field programmable gate array, a digital signal processor, or other suitable hardware. As used herein, "software" can include one or more objects, agents, threads, lines of code, subroutines, separate software applications, one or more lines of code or other suitable software structures operating in one or more software applications or on one or more processors, or other suitable software structures. In one exemplary embodiment, software can include one or more lines of code or other suitable software structures operating in a general purpose software application, such as an operating system, and one or more lines of code or other suitable software structures operating in a specific purpose software application.

In one exemplary embodiment, controller 217 executes instructions for detecting a training event that initiates training. The instructions can be accessed from storage 205, which includes computer readable media. In response to detecting a training event, training activator 213 activates a training signal for sending over speaker 231. Acoustic response detector 211 detects the acoustic response to the training signal. In one exemplary embodiment, the training signal can include only a predetermined frequency range to estimate human voices. For example, the training signal can consist of audible signals between about 190 Hz to 5 kHz (i.e., substantially between 190 Hz and 5 kHz) or other suitable frequency ranges. Controller 217 or related components can execute further instructions for adapting the trained profile 207 into AEC profile 209, which is a refined version of trained profile 207. Divergence detector 215 can compare AEC profile 209 and trained profile 207. As AEC profile 209 is refined, it can diverge from trained profile 207. Divergence detector 215 measures an amount of divergence and compares the amount to a threshold value. If a predetermined threshold value of divergence is detected, AEC profile 209 can be substituted by trained profile 207. The substituted profile (i.e., the new AEC profile) can then be reiteratively adapted based on responses of microphone 233 to audible outputs from speaker 231 and voice input from a user during a communication session. As shown, acoustic response detector 211 is responsible for detecting acoustic responses used in creating trained profile 207 and adapting AEC profile 209 based on continued acoustic response estimations. Interface 219 includes input 237 for sending voice signals to and output 235 from receiving voice signals from telephone 106, for example.

Figure 3:
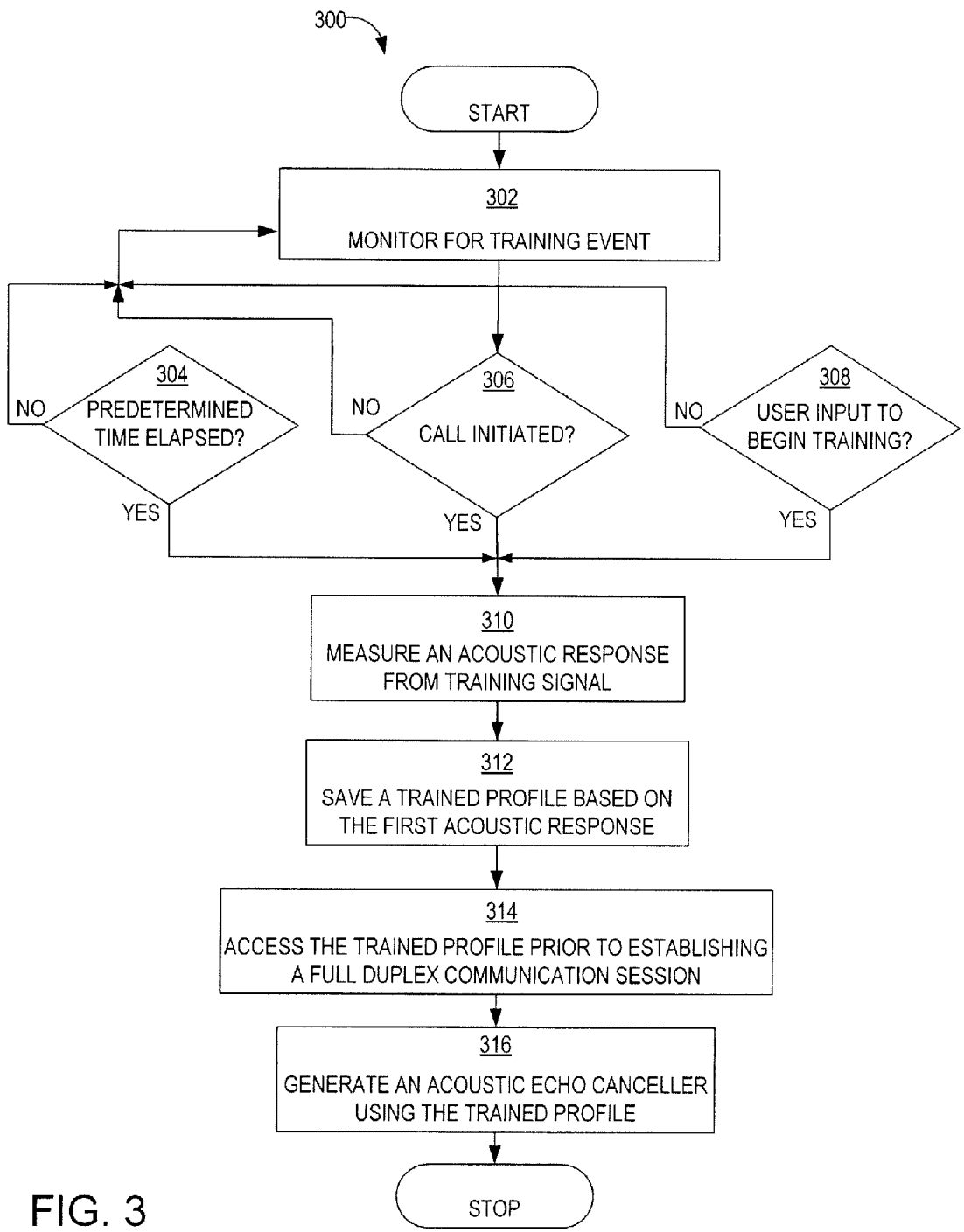
FIG. 3 is a flow chart of a method for conducting acoustic echo cancellation in accordance with an exemplary embodiment of the present invention.

FIG. 3 is a flow chart of method 300 for conducting acoustic echo cancellation in accordance with disclosed embodiments. Method 300 can be implemented as programs executed on a digital signal processor or other suitable general purpose processing platforms, or in other suitable manners. At 302, method 300 includes monitoring for a training event. Training events can include sensing a handset that is raised to initiate a communication session. Accordingly, AEC 128 (FIG. 1) can contain components of a magnetic switch, a level switch, or can contact a switch in the base of telephone 102 to inform AEC 128 that a training event (e.g., the initiation of a telephone call) has taken place. The dialing of a telephone number, the receipt of a call from other telephones, and a user initiating a speakerphone feature can also represent training events. In addition, a training event can be a user pressing a "train echo canceller" button (i.e., user input), that a predetermined time has elapsed, or that other events have occurred.

Accordingly, in one exemplary embodiment, method 300 includes operation 304 for determining whether a predetermined time has elapsed, operation 306 for determining whether a call has been initiated, and operation 308 for detecting whether user input has been received to request training. If any of these or other such training events (not shown) has occurred, method 300 proceeds to operation 310 to measure the acoustic response from a training signal. For example, in telephone 102 (FIG. 1), speaker 130 can output a multifrequency training signal and AEC 128 can measure the acoustic response from microphone 132 to the multifrequency training signal. Method 300 further includes operation 312 for saving a trained profile based on the first acoustic response. The trained profile is accessed in operation 314 prior to establishing a full duplex communication session. As shown, operation 316 includes generating an acoustic echo canceller using the trained profile. For telephone 102 (FIG. 1), generating an acoustic echo canceller can include configuring AEC 128 based on the trained profile. During a full duplex communication session, the trained profile can be further adapted to result in an adapted profile. If the adapted profile diverges to a threshold amount from the original trained profile, the adapted profile can be reset to the trained profile.

Although disclosed embodiments perform initial AEC training prior to a conversation, incremental changes can be made to a profile during a conversation. In contrast, some AECs have the AEC training only during conversations. Disclosed embodiments allow training the AEC with a signal or sequential signals that can be optimized for better echo response estimation. Specifically, the training signals can be optimized to have the same or similar levels at certain frequencies in range of frequencies. Alternatively, voice analysis can be performed or a history of voice inputs can be analyzed to produce a frequency distribution in a training signal that is intended to best estimate a future acoustic response.

Thus, disclosed embodiments are designed to achieve better initial cancellation and adaptability to have improved cancellation. In addition, AEC divergence is addressed by monitoring divergence and restricting drift of the estimation according to predetermined parameters. For example, if a threshold level of drift is detected, an adapted profile may be reset to the original, trained profile. Some exemplary embodiments may provide better solutions to exclusively using "double-filtering" because backup estimations may be less reliable than a stored profile that is adapted. Further, controls involving creating, accessing, and maintaining backup copies used in double filtering may be susceptible to mistakes. With some exemplary embodiments, users or administrators may initiate AEC training sessions or the training sessions may be in response to certain events.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the claimed subject matter is to be determined by the broadest permissible interpretation of the following claims and their equivalents, and shall not be restricted or limited by the foregoing detailed description.

What is claimed is:

1. A method for acoustic echo cancellation comprising:
    measuring a first acoustic response from a training signal introduced within an environment, wherein the training signal has a frequency distribution that is substantially uniform across a predetermined frequency range;
    saving a trained profile that is based on the measured first acoustic response;
    accessing the trained profile prior to establishing a session;
    generating an acoustic echo cancellation profile using the trained profile;
    determining whether a threshold level of divergence has occurred between an adapted profile and the trained profile during the communication session; and
    resetting the adapted profile to the trained profile in response to detecting the threshold level of divergence.

2. The method of claim 1, wherein measuring the first acoustic response from the training signal is in reaction to receiving a user input to initiate training.

3. The method of claim 1, wherein the predetermined frequency range substantially is 190 Hz to 5 kHz.

4. The method of claim 1, further comprising:
    adapting the trained profile into a refined profile based on a second acoustic response, wherein the second acoustic response is from a speech signal; and
    subtracting echo portions from the speech signal based on the refined profile.

5. The method of claim 4, further comprising:
    determining an estimated echo based on the refined profile;
    detecting divergence between the trained profile and the refined profile; and
    in response to detecting divergence, using the trained profile instead of the refined profile for determining further estimated echoes.

6. The method of claim 4, further comprising:
    prompting a user to provide voice input that is for deriving the training signal.

7. The method of claim 1 wherein measuring the first acoustic response from the training signal introduced within the environment comprises measuring the first acoustic response from the training signal introduced within the environment using a first ambient microphone, and further comprises applying the acoustic echo cancellation profile to a signal generated from a second handset microphone.

8. An acoustic echo canceller comprising:
    a training activator for initiating an audible training signal and for storing a trained profile based on a first response from an environment to the training signal;
    an adaptive filter for using the trained profile to subtract an estimated echo from a speech signal to result in a filtered speech signal, wherein the adaptive filter is further for developing a refined profile based on further responses from the environment to the filtered speech signal; and
    a divergence detector for detecting a level of divergence between the refined profile and the trained profile, wherein in response to detecting a threshold level of divergence, the trained profile is reinstated for future subtracting of estimated echo to result in the filtered speech signal.

9. The acoustic echo canceller of claim 8, further comprising:
    an interface for receiving a user request to create the training signal based at least in part on speech input to a microphone.

10. The acoustic echo canceller of claim 9, wherein the training signal includes a substantially evenly distributed frequency spectrum.

11. The acoustic echo canceller of claim 10, wherein individual tones of the frequency spectrum are substantially between 190 Hz and 5 kHz.

12. The acoustic echo canceller of claim 8, further comprising:
    an output device for prompting a user to provide speech input to a microphone for creating the training signal.

13. An acoustic echo cancellation system comprising:
    means for activating a training sequence prior to a user requesting a communication session from a full duplex communication system, wherein the training sequence includes machine-generated audio signals;
    a detector for measuring an acoustic response to the training sequence from a portion of the full duplex communication system, wherein the first acoustic response is used in creating a trained profile, wherein the detector is further used for measuring further acoustic responses from the full duplex communication system to the speaker signal, wherein an adapted profile is created based on the trained profile and is reiteratively modified based at least in part on the further acoustic response estimations; and a divergence detector for determining whether a threshold level of divergence has occurred between the adapted profile and the trained profile during the communication session;

wherein the adapted profile is reset to the trained profile in response to detecting the threshold level of divergence.

14. The acoustic echo cancellation system of claim 13, wherein the means for activating the training sequence repeats activating the training sequence substantially at a predetermined interval.

15. The acoustic echo cancellation system of claim 14, further comprising:

a storage for storing the trained profile and the adapted profile.

16. The acoustic echo cancellation system of claim 13, further comprising:

an output for requesting user voice input for creating the training sequence.

17. The acoustic echo cancellation system of claim 13, wherein the training sequence includes a signal having a substantially evenly distributed frequency spectrum.

18. The acoustic echo cancellation system of claim 17, wherein the frequency spectrum is substantially between 190 Hz and 5 kHz.

19. The acoustic echo cancellation system of claim 18, wherein the frequency, spectrum includes a plurality of frequency components with substantially equal magnitudes.

* * * * *

UNITED STATES PATENT AND TRADEMARK OFFICE
CERTIFICATE OF CORRECTION

| | | |
|---|---|---|
| PATENT NO. | : 8,411,847 B2 | Page 1 of 1 |
| APPLICATION NO. | : 12/136436 | |
| DATED | : April 2, 2013 | |
| INVENTOR(S) | : Bryan J. Burns, Yair Kerner and Eitan David | |

It is certified that error appears in the above-identified patent and that said Letters Patent is hereby corrected as shown below:

In the Claims:
Column 8, line 33, replace "relined" with "refined"
Column 10, line 14, delete "," after "frequency"

Signed and Sealed this
Eleventh Day of February, 2014

Michelle K. Lee
*Deputy Director of the United States Patent and Trademark Office*